United States Patent Office 3,527,769
Patented Sept. 8, 1970

3,527,769
PROCESS FOR PRODUCING AN OPTICALLY ACTIVE DIHYDROCHRYSANTHEMOLACTONE
Masanao Matsui, Tokyo, and Hirosuke Yoshioka, Nishinomiya-shi, Japan, assignors to Sumitomo Chemical Company, Ltd., Osaka, Japan, a corporation of Japan
No Drawing. Filed May 17, 1966, Ser. No. 550,597
Claims priority, application Japan, May 20, 1965, 40/29,910; May 31, 1965, 40/32,346, 40/32,352; June 4, 1965, 40/33,276
Int. Cl. C07d 7/06
U.S. Cl. 260—343.5
2 Claims

ABSTRACT OF THE DISCLOSURE

This invention relates to a process for producing optically active dihydrochrysanthemolactone using an optically active starting material.

---

This invention relates to a new process for producing an optically active dihydrochrysanthemolactone.

More specifically, this invention relates to a new process for producing an optically active dihydrochrysanthemolactone represented by the following formula.

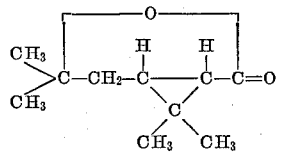

As is well known, chrysanthemic acid is an essential component of the natural and synthesized insecticides such as pyrethrin, cinerin, allethrin, cyclethrin or the like. From the stereo-structural point of view, it has two kinds of isomers, namely, cis- and trans-isomers, each of which has in turn (+) and (−) optically active antipodes. It is also known that these four kinds of isomers respectively have different roles in insecticidal effectiveness of the respective insecticidal compounds in which they are an acidic moiety.

The conventional methods for chemically producing chrysanthemic acid have given a mixture of optically inactive cis- and trans-forms. Accordingly, separation of the stereo-isomers and resolution of a desired optically active isomer, followed by racemization of the antipode isomer, had to be repeated to obtain an optically active chrysanthemic acid having high effectiveness.

A new process discovered by the present inventors gives selectively the optically active compound represented by the Formula I, which an optically active starting material is used.

While, the compound is easily converted to the corresponding optically active cis-chrysanthemic acid according to the method already disclosed in the Journal of Science and Food Agriculture 3,233 (1952) by S. H. Harper and R. A. Thompson. Besides, the optically active cis-chrysanthemic acid thus-produced may be easily converted to the optically antipodal trans-acid which is the most valuable in the production of pyrethroidal insecticides, by the procedure which has been discovered by the present inventors.

Thus, an object of the present invention is to provide a new process for producing an optically active compound represented by the Formula I with lower expenses and greater simplicity, compared with that of the prior process.

Other objects and advantages of the present invention will be apparent from the following description.

The present inventors have now found that these objects may be accomplished by the provision of the process which comprises, as first step, converting optically active 2,2-dimethyl-2-cis-(2′-oxo)propyl-cyclopropyl - 1 - acetaldehyde represented by the formula of

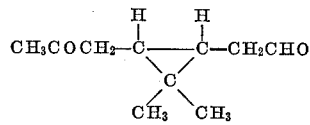

to novel optically active 1 - (2′ - acyloxy)vinyl - 2,2-dimethyl-3-(2″-oxo)propyl - 1,3 - cis - cyclopropane represented by the formula of

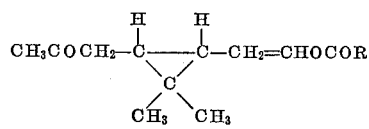

wherein R means a lower alkyl group, according to the conventional enol esterification method; as 2nd step, converting the enol ester represented by the Formula III to novel optically active alkyl 2,2-dimethyl-3-cis-(2′-oxo) propyl-cyclopropane - 1 - carboxylate represented by the formula of

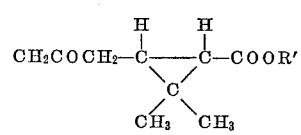

wherein R′ means a lower alkyl group, according to the conventional procedure for (1) ozonizing the said enol ester to obtain the azonide thereof, followed by reductive decomposition of the said ozonide to obtain optically active 2,2 - dimethyl-3-cis-(2′-oxo)propyl-cyclopropane-1-aldehyde represented by the formula of

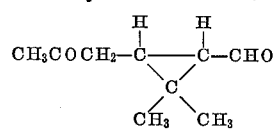

and successive oxidization of the aldehyde represented by the formula of V, or oxidative decomposition of the said ozonide of III, to obtain the carboxylic acid represented by the following formula,

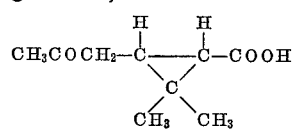

and (2) esterifying the said carboxylic acid IV to obtain the carboxylic acid ester represented by the formula of VI according to the conventional esterification method; as 3rd step, converting the carboxylic acid ester represented by the Formula VI to novel optically active alkyl 2,2-dimethyl-3-cis-(2′-hydroxy-2′-methyl) - propyl - cyclopropane-1-carboxylate represented by the formula of

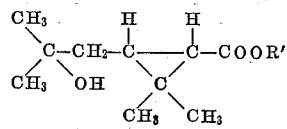

wherein R′ has the same meaning as identified above, by treating the said ester with a Grignard reagent represented by the formula of

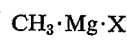

wherein X means a halogen atom;

as the last step, converting the hydroxycarboxylic acid ester represented by the Formula VI to optically active dehydrochrysanthemolactone represented by the Formula I according to the conventional procedure for hydrolyzing the said carboxylic acid ester to obtain novel optically active 2,2-dimethyl-3-cis-(2'-hydroxy - 2' - methyl)propylcyclopropane-1-carboxylic acid represented by the following formula,

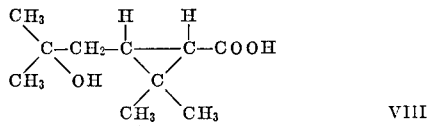

VIII followed by intramolecular dehydration of the said hydroxycarboxylic acid,

A full understanding of the present invention can be given by referring to the following detailed illustration.

The starting aldehyde material, II, may be prepared from $\Delta_3$-carene through ozonization and subsequent reductive decomposition according to the well known procedure disclosed by F. W. Semmler and H. von Schiller, in Ber. 60, 1591 (1927). If an optically active, namely (+) or (−) $\Delta_3$-carene is employed, the corresponding optically active aldehyde, II, can be obtained.

As to first step, the aldehyde represented by the Formula II is treated according to the voluntary enol-esterification procedure well known to those skilled in the art.

For example, the said aldehyde is heated at a temperature of 50° to 200° C. in a lower aliphatic monocarboxylic acid anhydride in the presence of sodium acetate or potassium acetate, or treated at a temperature of −20° to 100° C. in a lower aliphatic monocarboxylic acid halide in the presence of organic tertiary base such as pyridine, diethylaniline or triethylamine, or treated with a lower aliphatic monocarboxylic acid ester of an enolized lower aliphatic monoketone such as isopropenyl acetate in the presence of acidic ester-exchanging catalyst such as p-toluene-sulfonic acid, thereafter the reaction mixture is washed with cold water or diluted aqueous alkali solution and distilled in vacuo, thereby to obtain the novel enol ester represented by the Formula III.

As to the 2nd step, the enol ester represented by the Formula III is converted to the carboxylic acid ester represented by the Formula VI, more concretely, the said enol ester is dissolved in an available solvent which is inert to ozonization reaction. For example, petroleum ether, n-hexane, petroleum benzin, ligroin, an aromatic hydrocarbon such as benzene and toluene, a halogenated hydrocarbon such as methyl chloride, methylene dichloride, chloroform, carbon tetrachloride, 1,2-dichloroethane and 1,1,2,2-tetrachloroethane, a lower aliphatic carboxylic acid such as glacial acetic acid, a lower aliphatic carboxylic acid ester such as ethyl acetate and butyl acetate, a lower aliphatic ketone such as acetone, methyl ethyl ketone and the like are illustrated.

Thereafter, ozone gas as it is or diluted with such oxygen gas, nitrogen gas or air as is not concerned with ozonization reaction, is introduced in the said solution at a temperature of −80° to 30° C.

The formed ozonide is, as occasion demands, led voluntarily to the following two kinds of reaction routes. On one hand, hydrogen peroxide solution, if desired together with a mineral acid or acetic acid, is added to the said ozonide solution and the mixture is heated to oxidatively decompose the ozonide. Thereafter, the reaction mixture is treated by means of combination of common unit processes such as extraction and distillation, thereby to separate the carboxylic acid represented by the Formula IV with high yield.

On the other hand, glacial acetic acid is added to the said ozonide solution to replace the solvent which has been used in the ozonization reaction, further, if desired, an available organic solvent which is inert to reduction reaction, for example diethyl ether, diisopropyl ether, benzene, toluene or the like, is added to the said acetic acid solution for dilution thereof. Thereafter, zinc dust is added thereto to reduce the said ozonide and the reaction mixture is treated by means of unit processes such as filtration, extraction and distillation, thereby to obtain the pure aldehyde represented by the Formula V with high yield.

Besides, the said ozonide may be subjected to the catalytic reduction reaction or treated with sodium hydrogen sulfite, thereby to obtain the corresponding aldehyde.

Thus obtained aldehyde may be converted to the carboxylic acid represented by the Formula IV with voluntary use of such oxidizing agents as potassium permanganate, chromic acid, hydrogen peroxide, silver peroxide, oxygen or air.

Thus, according to the present invention, the enol ester may be easily converted to the carboxylic acid represented by the Formula IV and the aldehyde represented by the Formula V. The said carboxylic acid may be easily converted to lower alkyl ester of carboxylic acid according to the conventional method illustrated hereinafter.

The said carboxylic acid may be treated with diazomethane in an applicable solvent such as diethyl ether, benzene or methyl alcohol, or an aqueous solution of alkali metal salt of the said carboxylic acid is treated with dialkyl sulfate such as dimethyl sulfate or diethyl sulfate at a temperature of 20° to 200° C., if desired, in an organic solvent which is inert to esterification reaction, e.g. petroleum hydrocarbon such as petroleum ether or n-hexane and aromatic hydrocarbon such as benzene or toluene.

Besides, the said carboxylic acid may be treated in a lower aliphatic alcohol such as ethyl alcohol, propyl alcohol or butyl alcohol with an acidic esterification catalyst such as hydrogen chloride, sulfuric acid or p-toluenesulfonic acid at a temperature of 0° to 120° C. for from several hours to several days, thereby to obtain the corresponding carboxylic acid esters represented by the Formula VI. In this case, it is applicable to add an organic solvent such as benzene or toluene which is insoluble in water and may form the azeotropic mixture with water, in order to remove the water formed in esterification reaction out of the reaction system.

The esters may be obtained usually in state of a colorless transparent oily product by being separated from any by-products and purified by distillation in vacuo.

As to 3rd step, the ester represented by the Formula VI is converted to the hydroxycarboxylic acid ester represented by the Formula VII by use of a Grignard reagent having the formula of $CH_3MgX$, wherein X is a halogen atom. In this case, it is desirable to dissolve the said ester in an applicable anhydrous solvent in order to come to the good result. Various kinds of solvents may be employed, provided that they are substantially inert to the Grignard reaction in the present invention.

Namely, aliphatic ethers such as diethyl ether and dibutyl ether, alicyclic ethers such as tetrahydrofuran and dioxan, aromatic hydrocarbons such as benzene and toluene and petroleum hydrocarbons such as n-hexane, cyclohexane and petroleum benzin are illustrated.

In addition, cyclic ketals such as 4-methyl-1,3-dioxane, and dimethyl sulfoxide may be also employed. The Grignard reagents produced according to the conventional method, may be satisfactorily employed in order to accomplish the object.

In other words, a methyl Grignard reagent such as methyl-magnesium iodide, methylmagnesium bromide and methylmagnesium chloride, may be employed usually as the solution in ethyl ether. In carrying out the Grignard reaction, it is desirable to dissolve the said ester in an applicable solvent and then to add dropwise the theoretical amount of the Grignard reagent solution described above, in order to selectively attack the ketone radical without affecting the carboxylic acid ester radical.

This reaction is satisfactorily carried out at a temperature of from about −10° C. to the ambient temperature in case of reaction with a comparatively high reaction rate, or from the ambient temperature to a temperature at which the employed solvent boils, in case of reaction with a comparatively low reaction rate.

To isolate the resulting hydroxycarboxylic acid ester from the reaction mixture, diluted hydrochloric acid or diluted sulfuric acid, or if desired, an aqueous solution of ammonium chloride is usually added to the reaction mixture to decompose the produced Grignard complex, and successively the resulting mixture is treated by the conventional procedure such as decantation, concentration, distillation or chromatography.

As to the last step, the hydroxycarboxylic acid ester represented by the Formula VII is converted to the dihydrochrysanthemolactone represented by the Formula I.

More concretely, the said hydroxycarboxylic acid ester is hydrolyzed by use of an alkali reagent, thereby to obtain the carboxylic acid represented by the Formula VIII, which is easily converted to the said lactone represented by the Formula I according to the conventional method.

As the alkali reagent employed in the present hydrolysis reaction, an alkali metal hydroxide such as sodium hydroxide and potassium hydroxide, an alkali earth metal hydroxide such as barium hyroxide, an alkali metal carbonate such as sodium carbonate and potassium carbonate, and aqueous ammonium hydroxide are illustrated.

In addition, a water-soluble organic base, an aqueous solution of which has strong basic property, may be also employed. For example, a quaternary ammonium base such as methylamine, pyridine and tetramethylammonium hydroxide are illustrated.

As a solvent employed in the present hydrolysis reaction, those solvents which may dissolve both the said hydroxycarboxylic acid ester and an alkali reagent described above are most preferably employed. Besides, if desired, a mixture containing two or more kinds of solvents may be also employed, for example, a mixture of a water-soluble lower alkyl alcohol such as methyl alcohol or ethyl alcohol, with water is illustrated.

Moreover, if desired in carrying out the hydrolysis reaction, other organic solvents which are inert to this reaction may be employed together with solvents mentioned above.

A reaction temperature in carrying out this reaction must not be restricted to an exact extent, since the reaction may be satisfactorily carried out at a temperature of from 0° to 100° C. In case where the said hydroxycarboxylic acid must be taken out of the thus obtained alkali salt of the hydroxycarboxylic acid, when the reaction is over, the employed solvent but water is removed out of the reaction system as soon as possible. Thereafter, the reaction system is acidified by addition of diluted hydrochloric acid, sulfuric acid or another mineral acid, thereby to separate an oily product which is successively treated by means of extraction by use of a water-insoluble inactive solvent such as ethyl ether, benzene or petroleum ether. By removing such a solvent, the said carboxylic acid is obtained in state of a viscous oily product. The thus obtained carboxylic acid may be easily lactonized according to the conventional procedure.

Namely, for accomplishing the objective lactonization the said carboxylic acid may be kept at a temperature of 20° to 200° C. together with a catalytic amount of p-toluenesulfonic acid, or kept in a diluted mineral acid at a temperature of from 20° to 200° C., or kept in an organic acid anhydride such as acetic acid anhydride at a temperature of from 20° to 200° C.

As another reaction route, the hydroxycarboxylic acid ester represented by the Formula VII may be subjected to the reaction in a diluted mineral acid such as sulfuric acid at a temperature of from 20° to 200° C. to hydrolyze the ester residue.

Successively the thus obtained carboxylic acid may be lactonized according to the above-described procedure. The reaction mixture is subjected to an extraction with a water-insoluble organic solvent such as ethyl ether or benzene, and the layer is washed with a diluted aqueous alkali solution to remove some kinds of acidic impurities.

Removal of the employed organic solvent leaves an optically active dihydrochrysanthemolactone as in state of a colorless crystal.

The present inventors have also found that the present compounds represented by the Formulas I and III to VIII respectively retain the absolute steric configuration of two asymmetric carbon atoms, namely $C_1$ and $C_3$ atoms in the cyclopropane ring, during the course of the present process starting from the aldehyde II.

In other words, for example, the ($-$) optically active keto-aldehyde, II, which is obtained from ($+$)$\Delta_3$-carene, yields the ($-$) optically active carboxylic acid ester represented by the Formula VI, after the enol-esterification and ozonization cleavage according to the present process. The ester, VI, is converted to the ($-$) optically active carboxylic acid represented by the Formula VII, and the ($+$) optically active said compound to the ($+$) optically active said compound. Further, the ($-$) optically active hydroxycarboxylic acid ester represented by the Formula VIII is converted to the ($+$) optically active lactone represented by the Formula I, which may be converted, as mentioned above, to ($+$) cis-chrysanthemic acid and then to ($-$) trans-chrysanthemic acid. Vice versa, ($+$) trans-chrysanthemic acid can be derived from ($-$)$\Delta_3$-carene via the process according to the present invention.

It is needless to say that the process of the present invention should not be restricted to the reaction using the optically active compounds, but it includes the process for the production of optically inactive dihydrochrysanthemolactone from the optically inactive keto-aldehyde, II.

A more comprehensive understanding on the present invention can be obtained by referring to the following illustrative examples which are not intended, however, to unduly limit the invention.

EXAMPLE 1

Ten grams of ($-$)2,2-dimethyl-3-cis-(2'-oxo)propyl-cyclopropyl-acetaldehyde obtained from ($+$)$\Delta_3$-carene according to the conventional ozonolysis, 30 cc. of acetic acid anhydride and 5 g. of anhydrous sodium acetate are mixed and the mixture is heated for 2 hours at a temperature of 110° to 115° C. while being stirred.

After cooling, the reaction mixture is filtered to separate sodium acetate-acetic acid adduct, which is washed sufficiently with 50 cc. of benzene.

The washings are mixed with the filtrate and further the mixture is poured on 10 g. of crushed ice and shaked well, thereafter the water layer is removed.

The benzene layer is concentrated under diminished pressure of 15 mm. Hg at a temperature of 100° C., thereby to obtain 10 g. of an oily product.

The thus-obtained oily product is subjected to distillation in vacuo, thereby to obtain 5 g. of the light yellow oily product having B.P. 87° to 93° C./0.3 mm. Hg, $n_D^{14}$ 1,478, and infrared absorption spectra $\nu_{max}^{film}$. 1765, 1720, 1670, 1220, 1095, 1055 and 930 cm.$^{-1}$ Elementary analysis.—Calculated (percent) for $C_{12}H_{18}O_3$: C, 68.58; H, 8.57. Found (percent): C, 68.49; H, 8.64.

Accordingly, it is obvious that novel 1-(2'-acetoxy)-vinyl-2,2 - dimethyl-3 - (2"-oxo)propyl - 1,3-cis-cyclopropane represented by the Formula III is obtained.

EXAMPLE 2

Ten grams of 1-(2'-acetoxy)vinyl-2,2-dimethyl-3-(2"-oxo)propyl-1,3-cis-cyclopropane obtained in Example 1 is dissolved in 30 cc. of chloroform and the mixture is kept at a temperature of $-60°$ C.

Six hundred liters of ozone gas diluted to $2 \times 10^{-4}$ mol/liter with air is introduced therethrough during the period of 3 hours.

After chloroform is removed in vacuo at a temperature of 25° C. and less, a solution containing 30 cc. of glacial acetic acid in 100 cc. of ethyl ether is added to the oily residue. Sixteen grams of zinc dust is added thereto little by little at a temperature of less than 20° C. while being stirred and cooled.

After keeping the mixture at the same level of temperature for 30 minutes, the reaction mixture is filtered by means of suction to remove the solid product, which is sufficiently washed with ethyl ether. The washings are combined with the filtrate and the mixture is washed with cold water, aqueous saturated sodium bicarbonate solution and cold water respectively in this order and then dried over anhydrous sodium sulfate.

Removal of ethyl ether by distillation leaves 8 g. of an almost colorless oily product, namely novel 2,2-dimethyl - 3 - cis-(2'-oxo)propyl-cyclopropane - 1-aldehyde represented by the Formula V having B.P. 52° to 55° C./ 0.3 mm. Hg, $n_D^{15}$ 1.4660 and infrared absorption spectra $\nu_{max.}^{film}$ 2770, 1720, 1695 and 1120 cm.$^{-1}$ Six point three grams of the said aldehyde is dissolved in a mixture of 70 cc. of acetone and 14 cc. of water and the mixture is cooled to a temperature of 5° C. while being stirred. Four point five grams of potassium permanganate dust is little by little added thereto and the mixture is further stirred for 3 hours at room temperature.

A small amount of aqueous solution of sodium hydroxide is added thereto as far as the reaction mixture becomes strong alkaline and successively, steam is introduced therein to remove acetone.

Thereafter, the rest aqueous solution is filtered to remove the produced manganese dioxide, which is thoroughly washed with 100 cc. of hot water.

The washings are combined with the filtrate and the mixture is concentrated in vacuo to about 50 cc. volume.

Being strongly acidified with aqueous 10% sulfuric acid, the said mixture is saturated by addition of ammonium sulfate, thereby to isolate an oily product, which is subjected to sufficient extraction with ethyl ether. Thereafter, removal of the ether by distillation leaves brown oily 6 g. of novel 2,2-dimethyl-3-cis-(2'-oxo)propyl-cyclopropane-1-carboxylic acid represented by the Formula IV.

The thus-obtained carboxylic acid is mixed with ethyl ether containing a slight excess amount of diazomethane and the mixture is evaporated, thereby to leave the novel methyl ester represented by the Formula VI, having B.P. 55±2° C./0.4 mm. Hg.

Infrared absorption spectra of the said methyl ester:

$\nu_{max.}^{film}$ 1720–1700, 1170, 1120, 1095 cm.$^{-1}$

Infrared absorption spectra of the said methyl ester:

$\nu_{max.}^{film}$ 1725, 1175, 1137, 1090, 860 cm.$^{-1}$

Specific rotatory power (in chloroform) of the said methyl ester: $[\alpha]_D^{14}$ −23.7°.

EXAMPLE 3

Seven grams of 2,2 - dimethyl-3-cis-(2'-oxo)propyl-cyclopropane-1-aldehyde obtained according to the same way as in the first half of Example 2 is dissolved in 20 cc. of acetic acid.

Oxygen gas is introduced thereinto at a temperature of 20° C. until the said solution ceases the absorption. Removal of acetic acid by distillation in vacuo leaves 7.5 g. of an almost colorless oily product, which is confirmed as to be novel 2,2-dimethyl-3-cis-(2'-oxo)propyl-cyclopropane-1-carboxylic acid represented by the Formula IV.

The thus-obtained oily product is dissolved in 100 cc. of methyl alcohol solution containing 2% weight of hydrogen chloride, and the mixture is left as it is at a temperature of 20° C. for one week. Thereafter, powdered sodium bicarbonate is added thereto to neutralize the said reaction mixture and methyl alcohol is removed by distillation in vacuo.

Successively, 20 cc. of benzene is added thereto and the mixture is once washed with cold water and dried over anhydrous sodium sulfate. Removal of benzene by distillation in vacuo leaves 8 g. of the novel methyl ester represented by the Formula VI, as the almost colorless oily product.

EXAMPLE 4

The ozonide solution obtained according to the same way as the first half of Example 2 is added dropwise to 50 cc. of aqueous 10% solution of hydrogen peroxide acidified with sulfuric acid at room temperature while being stirred and the mixture is heated at a temperature of 50° C. for 30 minutes.

The reaction mixture is alkalized by addition of an aqueous solution of sodium hydroxide and successively steam is introduced thereinto to remove hte employed chloroform. The rest aqueous solution of the reaction mixture is washed once with ethyl ether, strongly acidified with 10% aqueous sulfuric acid, saturated by addition of ammonium sulfate and successively subjected to extraction with ethyl ether. The ether layer is dried over anhydrous sodium sulfate.

Thereafter, removal of the employed ether by distillation leaves, as the oily product, novel 2,2-dimethyl-3-cis-(2'-oxo)proply-cyclopropane-1-carboxylic acid represented by the Formula IV. The obtained oily product is neutralized by addition of an aqueous 10% solution of sodium hydroxide and 30 cc. of petroleum ether is added thereto.

Successively, 30 g. of dimethyl sulfate is added thereto at a temperature of 40° C. and the mixture is kept at the same level of temperature for 4 hours while being stirred.

The petroleum ether layer is separated, washed with aqueous solution of sodium bicarbonate and dried over anhydrous sodium sulfate.

After removing the employed petroleum ether by distillation, the residue is subjected to distillation in vacuo, thereby to obtain novel methyl (-) 2,3-dimethyl-3-cis-(2'-oxo)propyl-cyclopropane-1 - carboxylate represented by the Formula VI having B.P. 52° to 55° C./0.3 mm. Hg.

EXAMPLE 5

Four grams of methyl (-)2,2-dimethyl-3-cis-(2'-oxo)-propyl-cyclopropane-1-carboxylate obtained according to the same method as in Example 4 is dissolved in 50 cc. of methylmagnesium iodide solution in ethyl ether obtained by use of 4.8 g. of methyl iodide, 0.64 g. of magnesium metal and 15 cc. of purified ethyl ether according to the conventional method, is added thereto for 20 minutes at a temperature of 7° to 10° C. while being stirred. Further, the reaction mixture is stirred at the same level of temperature for 30 minutes and thereafter, 30 cc. of aqueous solution saturated with ammonium chloride is added to the reaction mixture while being cooled.

At the end of the exothermic reaction and disappearance of white solid product of Grignard complex, the ethereal layer is isolated and aqueous layer is once subjected to extraction with ethyl ether.

The combined ethereal layer is further washed with cold water and dried over anhydrous sodium sulfate. Removal of the ether by distillation on a bath kept at a temperature of 80° C. and less leaves as a colorless oily product, 4.3 g. of novel methyl (−)2,2-dimethyl-3-cis-(2' - hydroxy-2'-methyl)propyl-cyclopropane-1-carboxylate represented by the Formula VII.

Further, an extremely small amount of unreacted material may be removed by silica gel chromatography (benzene:chloroform=1:2), thereby to obtain as colorless oily product, the pure hydroxy-carboxylic acid ester.

Infrared absorption spectra:

$\nu_{max}^{film}$ 3460, 1730, 1175, 1090 cm.$^{-1}$

Specific rotary power (in chloroform):

$[\alpha]_D^{14} -16.1°$

EXAMPLE 6

Four grams of methyl (-)2,2-dimethyl-3-cis-(2'-hydroxy-2'-methyl)propyl-cyclopropane - 1 - carboxylate obtained in Example 5 is added to the solution consisting of 2 g. of potassium hydroxide and 20 cc. of methyl alcohol and the mixture is boiled for 3 hours on a bath under reflux.

After removal of methyl alcohol, water is added to the residue, and the solution is strongly acidified by addition of 10% aqueous sulfuric acid, thereby to produce an oily product, which is subjected to extraction with ethyl ether and dried over anhydrous sodium sulfate.

Removal of the ether by distillation leaves an extremely viscous oily product, 3.5 g. of the corresponding carboxylic acid. The thus-obtained carboxylic acid is dissolved in 10 cc. of toluene and successively 50 mg. of p-toluenesulfonic acid is added thereto. The mixture is boiled for 30 minutes under reflux.

After cooling, the toluene layer is washed with 5% aqueous sodium carbonate, further washed with cold water and thereafter dried over anhydrous sodium sulfate.

Removal of toluene by distillation leaves as the light yellow oily product, 3.0 g. of (+) dihydrochrysanthemolactone represented by the Formula I.

The said dihydrochrysanthemolactone is solidified by being left as it is and subjected to a recrystallization by use of n-hexane. The thus-obtained solid dihydrochrysanthemolactone shows the same analytical value as the authentic sample, namely B.P. 82° to 83° C., Specific rotatory power (in chloroform $[\alpha]_D^{14} +77°$.

EXAMPLE 7

Three point five grams of 2,2-dimethyl-3-cis-(2'-hydroxy-2'-methyl)propyl-cyclopropane-1 - carboxylic acid obtained according to the same way as in the first half of Example 6, is dissolved in 10 cc. of acetic acid anhydride and the mixture is boiled for 3 hours under reflux.

On removal of an excess amount of the employed reagent and acetic acid by distillation in vacuo, the residue is dissolved in benzene.

The benzene solution is washed with 5% aqueous sodium carbonate, successively with water and the benzene layer is dried over anhydrous sodium sulfate.

Removal of benzene by distillation leaves 3.0 g. of (+)dihydrochrysanthemolactone.

EXAMPLE 8

Four grams of methyl (+)2,2-dimethyl-3-cis-(2'-hydroxy-2'-methyl)propyl-cyclopropane - 1 - carboxylate is mixed with 50 cc. of 5% aqueous sulfuric acid and the mixture is stirred for 5 hours at a temperature of 100° C.

Thereafter 20 cc. of benzene is added thereto and the benzene layer is taken out, then washed with 5% aqueous sodium carbonate, successively with water and dried over anhydrous sodium sulfate. Removal of benzene by distillation leaves 3 g. of (-)dihydrochrysanthemolactone.

What we claim is:

1. A process for producing an optically active dihydrochrysanthemolactone represented by the formula

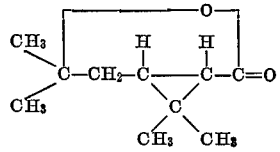

which comprises converting an optically active 1-(2'-acyloxy)-vinyl - 2,2 - dimethyl - 3 - (2''-oxo)propyl-1,3-cis-cyclopropane represented by the formula

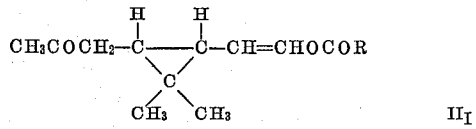

III wherein R is a lower alkyl radical, to an optically active 2,2-dimethyl - 3 - cis - (2' - oxo)propyl-cyclopropane-1-carboxylic acid ester represented by the formula

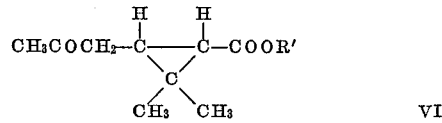

VI wherein R' is a lower alkyl radical, by treating the ester represented by Formula III with ozone gas in an organic solvent at a temperature of −80° to 30° C., and (1) treating the resulting ozonide with hydrogen peroxide to obtain the corresponding carboxylic acid represented by the formula,

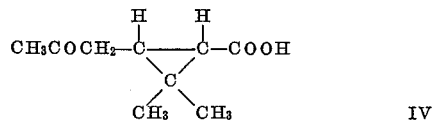

IV or (2) treating the resulting ozonide with zinc or sodium hydrogen sulfite to obtain optically active 2,2-dimethyl-3-cis-(2'-oxo)propyl - cyclopropane-1-aldehyde represented by the formula

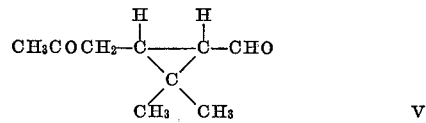

V and successively oxidizing the aldehyde represented by Formula V, to obtain the corresponding carboxylic acid represented by the Formula IV and esterifying the carboxylic acid IV obtained according to above process (1) or (2) to obtain the optically active carboxylic acid ester represented by Formula VI; converting the carboxylic acid ester represented by Formula VI to an optically active 2,2-dimethyl-3-cis - (2' - hydroxy - 2' - methyl)propyl-cyclopropane-1-carboxylic acid ester represented by the general formula

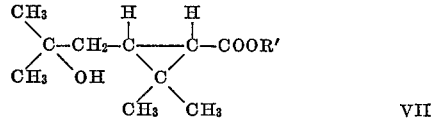

VII wherein R' is a lower alkyl radical, by treating the carboxylic acid ester represented by Formula VI with a Grignard reagent represented by the general formula of $CH_3 \cdot Mg \cdot X$ wherein X is a halogen atom, in an organic solvent at a temperature from −10° C. up to the boiling point of the solvent; and converting the optically active hydroxycarboxylic acid represented by formula VII to an optically active 2,2 - dimethyl-3-cis-(2'-hydroxy-2'-methyl)propyl-cyclopropane-1-carboxylic acid represented by the formula,

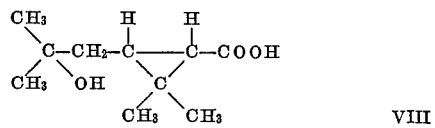

VIII by treating the hydroxycarboxylic acid ester represented by Formula VII with an alkali metal hydroxide, an alkali earth metal hydroxide, an alkali metal carbonate, an aqueous ammonium hydroxide or a water-soluble organic base in a solvent at a temperature of 0° to 100° C.; and converting the hydroxycarboxylic acid represented by Formula VIII to the optically active dihydrochrysanthemolactone represented by Formula I by treating the hydroxy carboxylic acid VIII at a temperature from 20° to 200° C. with a catalytic amount of p-toluenesulfonic acid or with a dilute mineral acid or with an organic acid anhydride.

2. A process for producing an optically active dihydrochrysanthemolactone represented by the formula

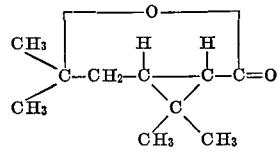

which comprises converting optically active 2,2-dimethyl-3-cis-(2'-oxo)propyl - cyclopropyl-1-acetaldehyde represented by the formula

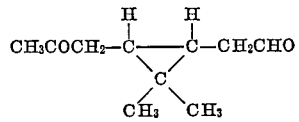

to an optically active 1-(2'-acyloxy)vinyl-2,2-dimethyl-3-(2"-oxo) - propyl - 1,3-cis-cyclopropane represented by the general formula

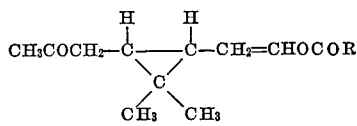

wherein R represents a lower alkyl radical, by an enol-esterification with a lower aliphatic monocarboxylic acid anhydride in the presence of sodium or potassium acetate at a temperature of 50° to 100° C., or with a halide of a lower aliphatic monocarboxylic acid in the presence of an organic tertiary base at a temperature of —20° to 100° C., or with an ester of a lower aliphatic monocarboxylic acid in the presence of an acidic ester-exchanging catalyst; converting the ester represented by Formula III to an optically active 2,2 - dimethyl - 3-cis-(2'-oxo)propyl-cyclopropane-1-carboxylic acid ester represented by the formula

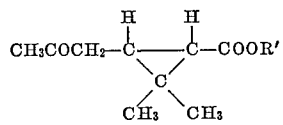

wherein R' is a lower alkyl radical, by treating the ester represented by Formula III with ozone gas in an organic solvent at a temperature of —80° to 30° C., and (1) treating the resulting ozonide with hydrogen peroxide to obtain the corresponding carboxylic acid represented by the formula,

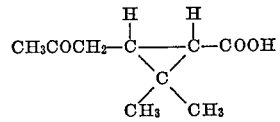

or (2) treating the resulting ozonide with zinc or sodium hydrogen sulfite to obtain optically active 2,2-dimethyl-3-cis-(2' - oxo)propyl - cyclopropane - 1 - aldehyde represented by the formula

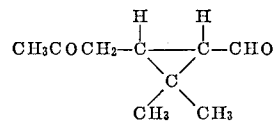

and successively oxidizing the aldehyde represented by Formula V, to obtain the corresponding carboxylic acid represented by the Formula IV and esterifying the carboxylic acid IV obtained according to above process (1) or (2) to obtain the optically active carboxylic acid ester represented by Formula VI; converting the carboxylic acid ester represented by Formula VI to an optically active 2,2-dimethyl-3-cis-(2' - hydroxy-2'-methyl)propyl-cyclopropane-1-carboxylic acid ester represented by the general formula

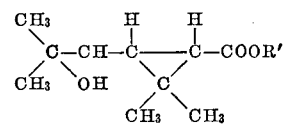

wherein R' is a lower alkyl radical, by treating the carboxylic acid ester represented by Formula VI with a Grignard reagent represented by the general formula of

wherein X is a halogen atom, in an organic solvent at a temperature from —10° C. up to the boiling point of the solvent; converting the optically active hydroxycarboxylic acid represented by Formula VII to an optically active 2,2-dimethyl-3-cis-(2'-hydroxy-2' - methyl)propyl - cyclopropane-1-carboxylic acid represented by the formula,

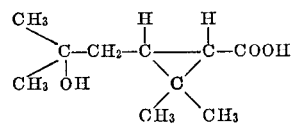

by treating the hydroxycarboxylic acid ester represented by Formula VII with an alkali metal hydroxide, an alkali earth metal hydroxide, an alkali metal carbonate, an aqueous ammonium hydroxide or a water-soluble organic base in a solvent at a temperature of 0° to 100° C.; and converting the hydroxycarboxylic acid represented by Formula VIII to the optically active dihydrochrysanthemolactone represented by Formula I by treating the hydroxycarboxylic acid VIII at a temperature from 20° to 200° C. with a catalytic amount of p-toluenesulfonic acid or with a dilute mineral acid or with an organic acid anhydride.

References Cited

Heuben-Weyl:, vol 6/2, Methoden Der Organischen Chuane, pp. 571–575.

Morrison et al.:, Organic Chemistry, 1961, pp. 717–18.

Wagner et al.:, Synthetic Organic Chemistry, 1953, p. 533.

ALEX MAZEL, Primary Examiner

J. A. NARCAVAGE, Assistant Examiner

U.S. Cl. X.R.

260—339, 468, 494, 514, 598, 999